United States Patent [19]

Collins

[11] Patent Number: 5,549,285
[45] Date of Patent: Aug. 27, 1996

[54] WIRE ROPE ISOLATOR WITH CRIMP BAR AND METHOD FOR MAKING SAME

[75] Inventor: Michael J. Collins, Lockport, N.Y.

[73] Assignee: Enidine, Inc., Orchard Park, N.Y.

[21] Appl. No.: 426,059

[22] Filed: Apr. 21, 1995

[51] Int. Cl.⁶ ........................................ F16F 1/36
[52] U.S. Cl. ............................ 267/148; 267/166; 29/505; 248/570
[58] Field of Search .................................. 267/166, 167, 267/136, 148, 149, 170, 174, 179, 180, 250, 286, 287, 182; 248/570; 29/505, 515, 516, 520, 437

[56] References Cited

U.S. PATENT DOCUMENTS

| | | |
|---|---|---|
| 3,044,759 | 7/1962 | Kerley, Jr. . |
| 3,065,959 | 11/1962 | Kerley, Jr. et al. . |
| 3,204,911 | 9/1965 | Lawrence et al. . |
| 3,360,225 | 12/1967 | Camossi . |
| 3,596,865 | 8/1971 | Camossi . |
| 4,190,227 | 2/1980 | Belfield et al. . |
| 4,397,069 | 8/1983 | Camossi . |
| 4,854,556 | 8/1989 | Pietrzak ................................ 267/148 |
| 5,240,232 | 8/1993 | Loziuk . |
| 5,277,394 | 1/1994 | Slemmer . |
| 5,360,210 | 11/1994 | Loziuk . |

FOREIGN PATENT DOCUMENTS 1634860  3/1991  U.S.S.R. .................................. 267/148

*Primary Examiner*—Lee Young
*Attorney, Agent, or Firm*—Harris Beach & Wilcox

[57] ABSTRACT

A wire rope vibration isolator includes a coil of wire rope having a predetermined number of individual consecutive coils, a first crimp bar, and a second crimp bar. Each of the crimp bars is essentially rectangular in shape and has a pair of opposing side surfaces. A series of lateral holes extending from one side surface to the other side surface of each of the bars is provided so that the predetermined number of individual consecutive coils may be threaded through the series of lateral holes of each of the bars. A crimping force is applied to each of the two crimp bars at a point where each of the individual coils passes through a respective bar. The coils are thereby secured in a fixed position relative to one another while remaining elastically deformable. A spring-like quality is thus imparted to the coil of wire rope so that the first crimp bar and the second crimp bar may move relative to each other to dissipate vibrational energy.

12 Claims, 5 Drawing Sheets

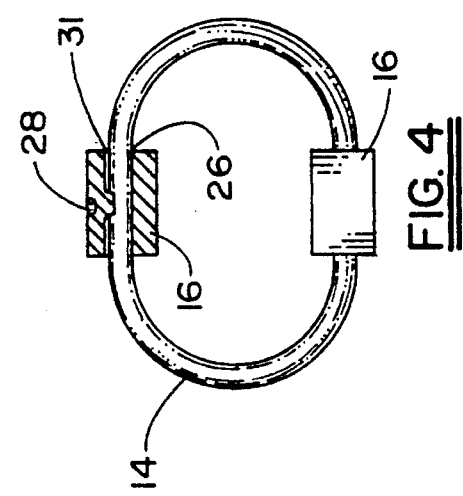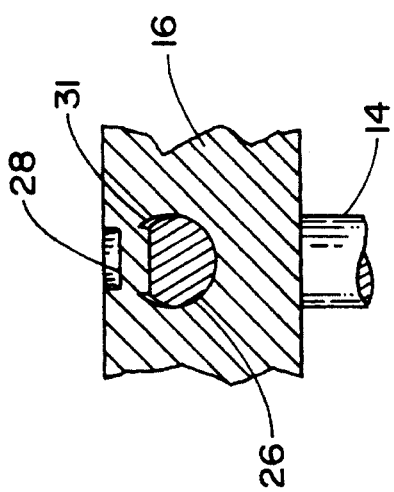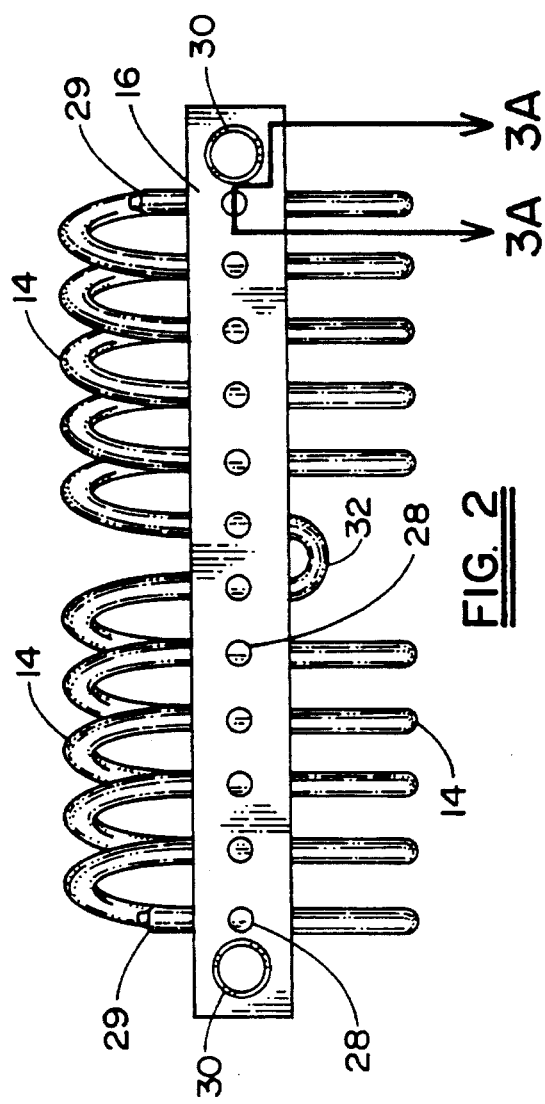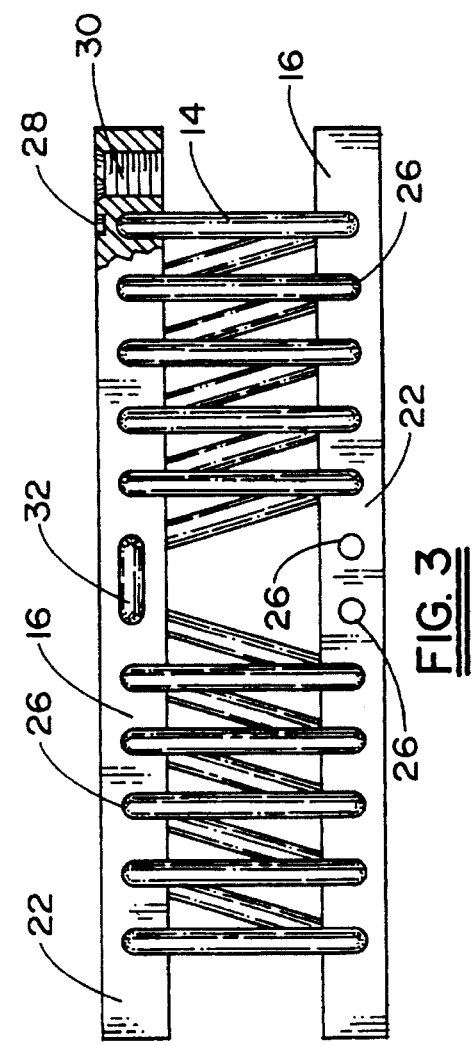

WIRE ROPE ISOLATOR WITH CRIMP BAR AND METHOD FOR MAKING SAME

BACKGROUND OF THE INVENTION

1. Field of the Invention

This invention relates in general to vibration isolators and, in particular, to wire rope vibration isolators. More specifically, but without restriction to the particular embodiment hereinafter described in accordance with the best mode of practice, this invention relates to wire rope vibration isolator employing a crimp bar to secure the wire rope therein.

2. Discussion of the Related Art

Numerous mechanical systems require energy absorption devices for dissipating the kinetic energy of a component element in the system. Such mechanical systems include, for example, shipping cases, skids and containers, shipboard electronics and navigational equipment, pumps, generators and compressors, chemical processing equipment, avionics, and various other such industrial systems. Shock and vibration affect the performance of all types of mechanical and electrical equipment contained in these industrial systems. If such shock and vibration are left uncontrolled, they can cause premature equipment failure and costly downtime.

Many energy absorption devices have been proposed for use in industrial applications where control or damping of shock and vibration are required. One class of such energy absorption devices includes shock absorbers. The typical shock absorber is provided with a sealed outer cylinder, an internal shock tube, a piston having a head portion and a rod portion for engaging the moving system component, and an accumulator for collecting fluid from the interior of the shock tube when the piston head moves into the tube. The shock absorber also includes an orifice area that allows passage of fluid from the shock tube to the accumulator as the means for dissipating the energy received by the piston rod. A system of check valves and return passageways is also commonly provided to allow repeated circulation of fluid between the shock tube and the accumulator. The structure of this type of energy absorption device also requires various fluid seals to prevent leakage. The shock absorbers in class of energy absorption devices have many useful industrial applications. This type of shock absorber is mechanically complex and is ideally employed within a restricted temperature range.

An alternative class of energy absorption devices includes wire rope vibration isolators. This type of device does not include any moving parts, circulating fluid, or fluid seals. The wire rope isolator is thus ideally suited for extreme temperature applications. Such wire rope isolators typically include a coil of rope wire clamped between a pair of retainer blocks. The retainer blocks are secured against each other by a series of screws provided along the retainer blocks.

The art of wire rope vibration isolators has been contributed to by a number of proposed devices including the metal cable absorber illustrated in U.S. Pat. No. 3,596,865 issued to C. Camossi, the isolator apparatus shown in U.S. Pat. No. 4,783,038 to C. L. Gilbert et al., and the vibration and shock absorber device discussed in U.S. Pat. No. 5,062,507 issued to A. Roche. All of these devices employ threaded fasteners to clamp two retainer blocks against each other with wire rope coils secured between the blocks. While this type of isolator has advantages, the machining of the threaded hole and complicated assembly require substantial time. In addition there is the possibility that the threaded fasteners become loose during the service life of the device. The vibration isolator proposed by R. E. Belfield et al. in U.S. Pat. No. 4,190,227 employs a method whereby the wire cable coils are molded in retainer block which is formed from a thermoplastic material such as polyvinyl chloride or polystyrene. While this type of device avoids costly machining associated with other types of prior wire rope isolators, it may fail under extremely heavy loads or temperatures. The manufacture of the molded retainer block also requires costly molds and complicated melting and curing operations. A structural disadvantage of the molded retainer block is that the bonded interface between the thermoplastic material and wire cable may fail due to cyclic fatigue.

OBJECTS AND SUMMARY OF THE INVENTION

It is, therefore, an object of the present invention to improve energy absorption devices.

Another object of this invention is to improve wire rope vibration isolators for use in industrial applications.

It is a further object of the present invention to utilize all metal components in a wire rope vibration isolator so that the isolator may function under extreme operating conditions such as temperature and load.

Still another object of the present invention is to avoid a bonded chemical interface between the bar member and wire coils of a wire rope vibration isolator.

It is yet a further object of the present invention to reduce the manufacturing time required to assemble a wire rope vibration isolator.

Yet still another object of the present invention is to eliminate costly machining operations associated with securing retainer plates to the wire coils of a wire rope isolator.

An additional object of the present invention is to minimize the number of parts required to assemble a wire rope isolator for industrial applications.

Yet a further object of the present invention is to employ a mechanical bond between the bar member and wire coils of a wire rope vibration isolator so that the effects of cyclic fatigue on the bond are minimized.

Still yet another object of the present invention is to utilize a method with a minimum of process steps for manufacturing a variety of sizes of wire rope isolators.

These and other objects are attained in accordance with the present invention wherein there is provided a wire rope vibration isolator including a coil of wire rope having a predetermined number of individual consecutive coils, a first crimp bar, and a second crimp bar. According to one aspect of this invention, each of the crimp bars is rectangular in shape and has a pair of opposing side surfaces. A series of lateral holes extending from one side surface to the other side surface of each of the bars is provided so that the predetermined number of individual consecutive coils may be threaded through the series of lateral holes of each of the bars. In this manner, when a crimping force is applied to each of the two crimp bars at a point where each of the individual coils passes through a respective bar, the coils are thereby secured in a fixed position relative to one another while remaining elastically deformable. A spring-like quality is thus imparted to the coil of wire rope so that the first crimp bar and the second crimp bar may move relative to each other to dissipate vibrational energy.

According to the method of the present invention, the isolator is manufactured by first forming a series of lateral holes through a first bar of malleable material, similarly forming a corresponding series of lateral holes through a second bar of malleable material. A length wire rope is then threaded consecutively through the series of lateral holes is the first and second bars of malleable material to thereby form a coil of wire rope having a predetermined number of individual coils with the bars extending along the length of the coil. In accordance with further aspects of the method of this invention, each of the first and second bars is crimped at a point where each of the individual coils passes through a respective bar. In this manner, the individual coils are thereby secured in their fixed position relative to one another to give a spring-like quality to the coil of wire rope.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing with like reference numerals indicating like components throughout, wherein:

FIG. 2 is a is a top view of the wire rope vibration isolator illustrated in FIG. 1;

FIG. 3 is a partially broken away side elevation view of the embodiment of the wire rope vibration isolator shown in FIGS. 1 and 2;

FIG. 3A is an enlarged cross-sectional isolation view taken along line 3A—3A of FIG. 2;

FIG. 4 is a partially broken away end view of the wire rope vibration isolator illustrated in FIG. 3;

DETAILED DESCRIPTION OF A PREFERRED EMBODIMENT

Figure 1:
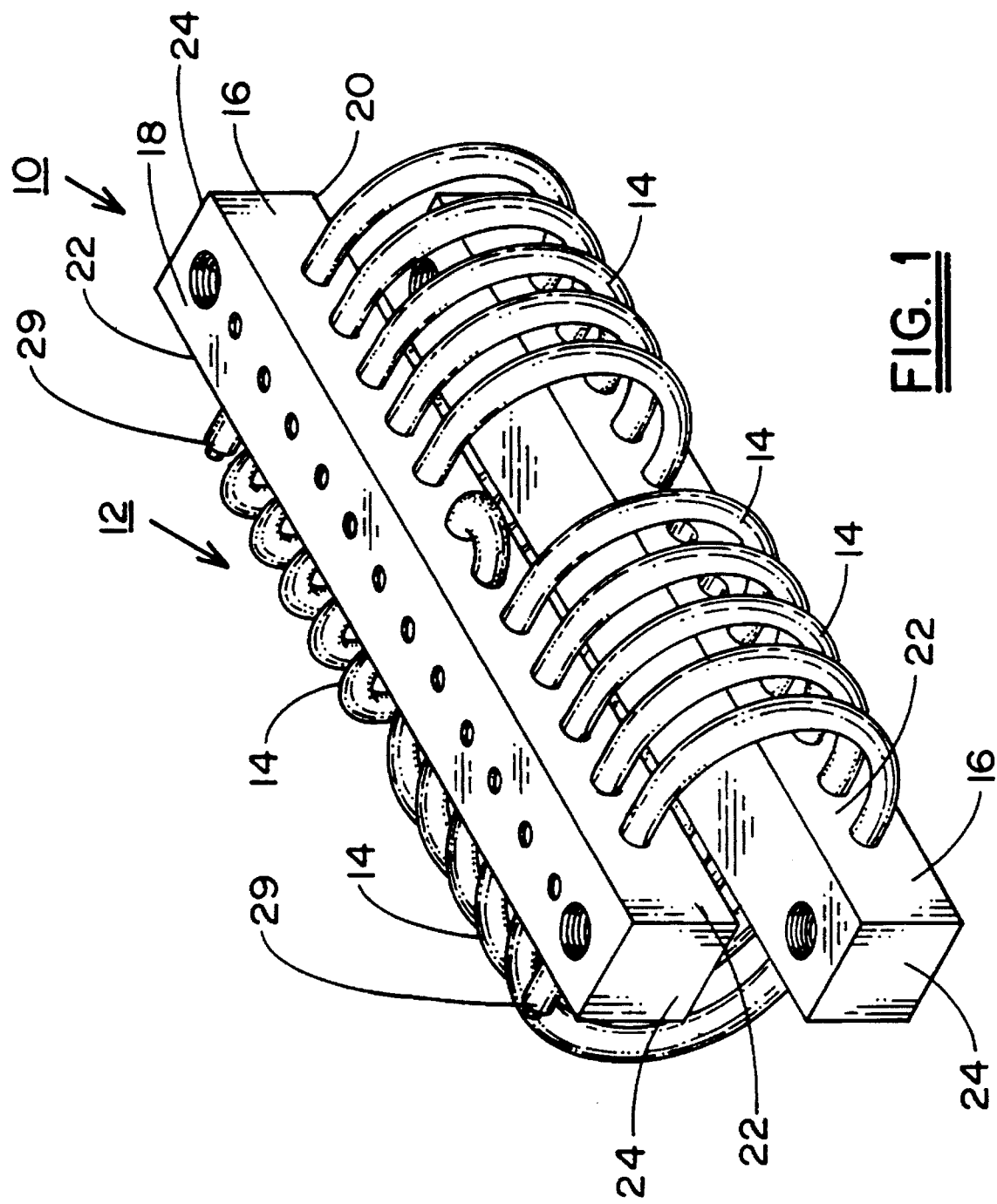
FIG. 1 is a perspective view of one embodiment of a wire rope vibration isolator according to the present invention.

Referring now to FIG. 1 there is shown a wire rope vibration isolator 10 in accordance with the present invention. The isolator 10 includes a substantially cylindrical coil of wire rope 12 which has a predetermined number of individual consecutive coils 14. The number of coils 14 will vary depending on the load and required damping characteristics for a particular application. It is currently contemplated that the diameter of wire rope used to form the isolator 10 may vary between 1/16 and 1 1/4 of an inches. The length of the isolator 10 will range from 3 to 24 inches, while the diameter thereof may vary from approximately an inch to 12 inches. It is thus proposed that the isolator 10 may have linear dimensions within these ranges and be designed with any one of a variety of damping characteristics. These ranges, however, are merely preferable size ranges identified by way of example, not limitation. Certain applications of the isolator 10 may require dimensions beyond the illustrative ranges discussed above. The isolator 10 also includes a pair of blocks or crimp bars 16—16. Each of the crimp bars 16 is preferably formed from a malleable material such as aluminum which is in the shape of a substantially rectangular bar with an opposing top surface 18 and bottom surface 20, opposing side surfaces 22, and two end surfaces 24. The crimp bars 16 are not limited to being rectangular in shape, but may also be round, half-round, formed with a crescent or oval top surface, or formed with any other suitable geometry.

With reference to FIGS. 2–4, the isolator will be described in further detail. For purposes of convenience, only one of the crimp bars 16 will be discussed since the two crimp bars are substantially identical. As illustrated in FIG. 3, the crimp bar 16 is provided with a series of lateral holes 26 formed therethrough from one side surface 22 to the other side surface 22 so that the individual consecutive coils 14 may be threaded through the lateral holes 26 of each of the crimp bars 16 to form the illustrated isolator 10. Each of the individual coils 14 is secured in place by a crimp 28 at a point where each of the individual coils 14 passes through a respective crimp bar 16. The individual coils 14 are thereby secured in a fixed position relative to one another while the cylindrical coil of wire rope 12 retains a spring-like quality for damping vibrational energy. The crimps 28 are formed by exerting a crimping force in the desired location. The crimping force plastically deforms the immediately adjacent material and forms a mechanical bond between the wire rope and the crimp bar 16. This crimping or staking process will be described in further detail below in conjunction with the method of this invention. The isolator 10 is attached to any number of different mechanical components in the selected working environment by use of bolts and mounting holes 30 provided in each of the crimp bars 16. The ends of the wire rope forming the coil 12, are each covered with a protective end cap 29, FIGS. 1 and 2. The end caps 29 are preferably formed from a durable shrink wrap plastic material so that they are not easily removed.

The cylindrical coil of wire rope 12 is preferably formed in the shape of two opposing coil springs as illustrated in FIGS. 1–3. In this embodiment of the cylindrical of wire rope 12, the coil includes a central U-shaped segment 32 with individual coils extending outwardly therefrom along the length of the isolator 10. The individual coils 14 will have a natural inclination from top to bottom-right or top to bottom-left as shown in FIG. 3. The wire coil 12 is preferably wound in this manner to create a symmetry about a central axis. This symmetry enables the isolator 10 to retain a preferred shape and provide a particular damping quality. The cylindrical coil of wire rope 12 may alternatively be wound in the shape of a conventional coil spring, or in any number of different winding patterns.

Referring now to FIGS. 3A and 4, it is illustrated that the lateral holes 26 are provided with a diameter that is slightly larger than the wire rope forming the individual coils 14. The crimp 28 extends into the hole 26 and bonds the wire in place. In this manner, a gap 31 is maintained between the top of the wire rope and the circumference of the hole 26. The individual coils 14 are thus secured over a relatively small area. The lengths of wire rope leading into and out of the hole 26, are free to vibrate. Laboratory analysis has established that this vibration reduces cyclic fatigue of the coils 14 and the crimp bar 16 when compared to a design where the hole 26 is crimped along its entire side-to-side length.

Figure 5:
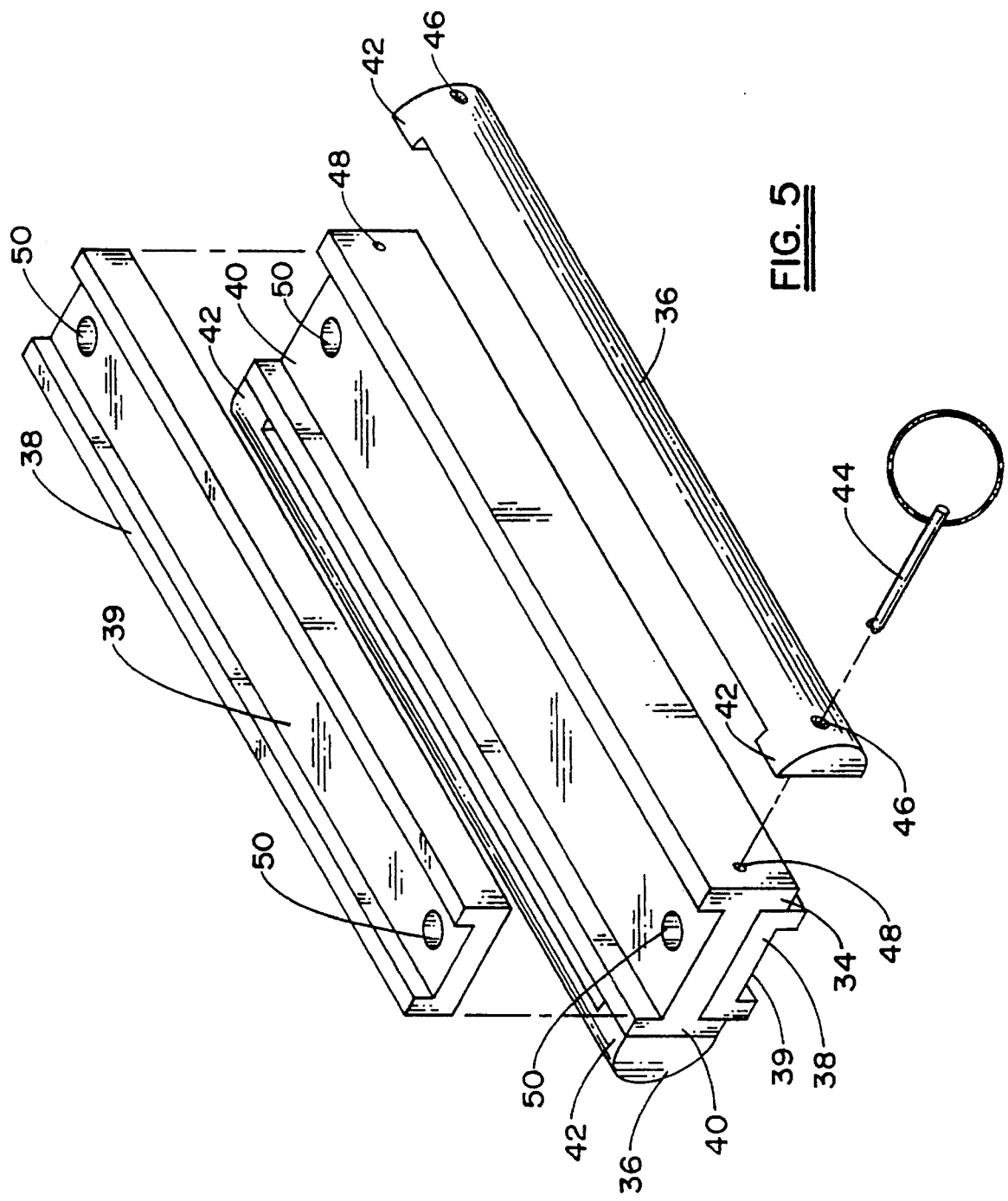
FIG. 5 is a partially exploded perspective view of a multi-piece reaction bar employed by the method of the present invention.

FIG. 5 shows a reaction bar 32 used in accordance with the method of the present invention. The reaction bar 32 is preferably a multi-piece reaction bar including a center block 34, a pair of side bars 36, and a pair of channeled slide bars 38. Each of the slide bars 38 is provided with a channel 39 while the center block 34 has a pair of side surfaces 41. These component elements of the reaction bar 32 are preferably machined from hardened steel. As illustrated in FIG. 5, the center block 34 is provided with two opposing slots 40 into each of which, a respective slide bar 38 may be placed. A close fit is provided between each of the slide bars 38 and their respective slot 40. Each of the side bars 36 include a pair of end steps 42 which come in contact with a respective side surface 41. The side bars 36 may be attached to the center block 34 by a lynch pin 44 insertable into corresponding holes 46 and 48 formed, respectively, in the side bar 36 and the center block 34. A retainer hole 50 is provided near each end of the center block 34 and the slide bars 38.

Figure 6:
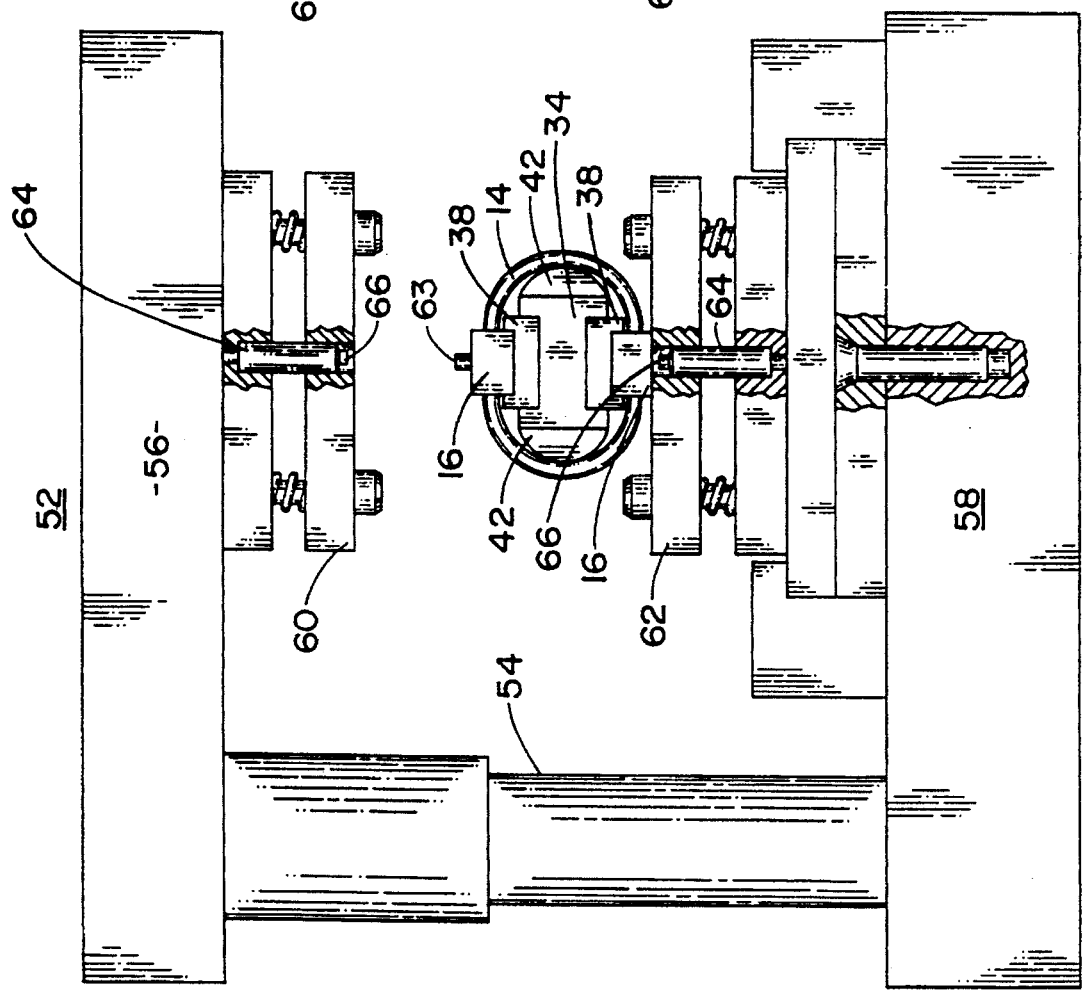
FIG. 6 is a partially broken away side elevation view of a crimping press showing the isolator and reaction bar assembly positioned thereon in accordance with the method of the present.

The method of the present invention will now be described in detail with particular reference to FIGS. 5–8. Upon assembly of the isolator 10, the reaction bar 32 is assembled as described above with reference to FIG. 5. A crimp bar 16 is then placed in each of the channels 39. The retainer holes 50 of both the center block 34 and the slide bars 38, are positioned in register with the mounting holes 30 when a crimp bar 16 is loaded into the retainer bar 32. The lateral holes 26 are located above the top edge of each of the slide bars 38 as best shown in FIG. 6. The loaded reaction bar 32 is then positioned on a winding fixture (not shown) and a length of wire rope is threaded through the lateral holes 26 in a desired winding pattern.

Figure 7:
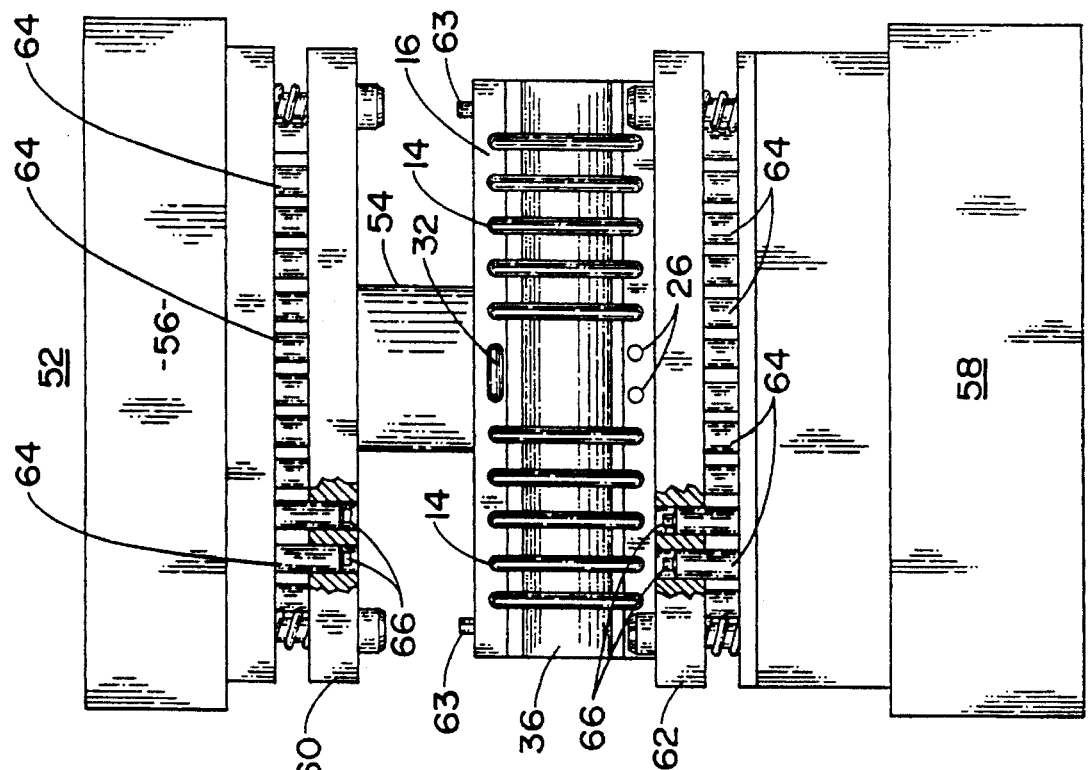
FIG. 7 is a partially broken away front elevation view of the crimping press and isolator reaction bar assembly illustrated in FIG. 6.

The crimping aspect of the method of the present invention is now described with reference to FIGS. 6 and 7. After the threading process described above, the reaction bar 32 and isolator 10 assembly is positioned on a crimping press 52. The crimping press 52 includes an extendable neck portion 54 connected to an upper shoe 56 and a lower shoe 58. The upper shoe 56 is connected to an upper stripper 60 while the lower shoe 58 similarly includes a lower stripper 62. The lower stripper 62 is provided with a pair of mounting pegs 63 best shown in FIG. 8. Each of the mounting pegs 63 extends through the corresponding mounting holes 30 and retainer holes 50 to secure the assembly to the crimping press 52. Each of the shoe and stripper assemblies is provided with a series of crimping bits 64 each having a distal tip segment 66. As best shown in FIG. 7, each of the distal tip segments 66 of the crimping bits 64 is aligned at a point where each of the individual coils 14 passes through a respective crimp bar 16. When the crimp press 52 is activated, the upper shoe 56 moves toward the lower shoe 58 and a crimping force is applied by the upper crimping bits 64 to the upper bar 16. A reaction force is transmitted through the reaction bar 32. The press 52 continues to be activated until the crimps 28 are thereby formed. The crimped reaction bar 32 and isolator 10 assembly is removed from the press 52 for disassembly of the reaction bar 32 from within the isolator 10.

Figure 8:
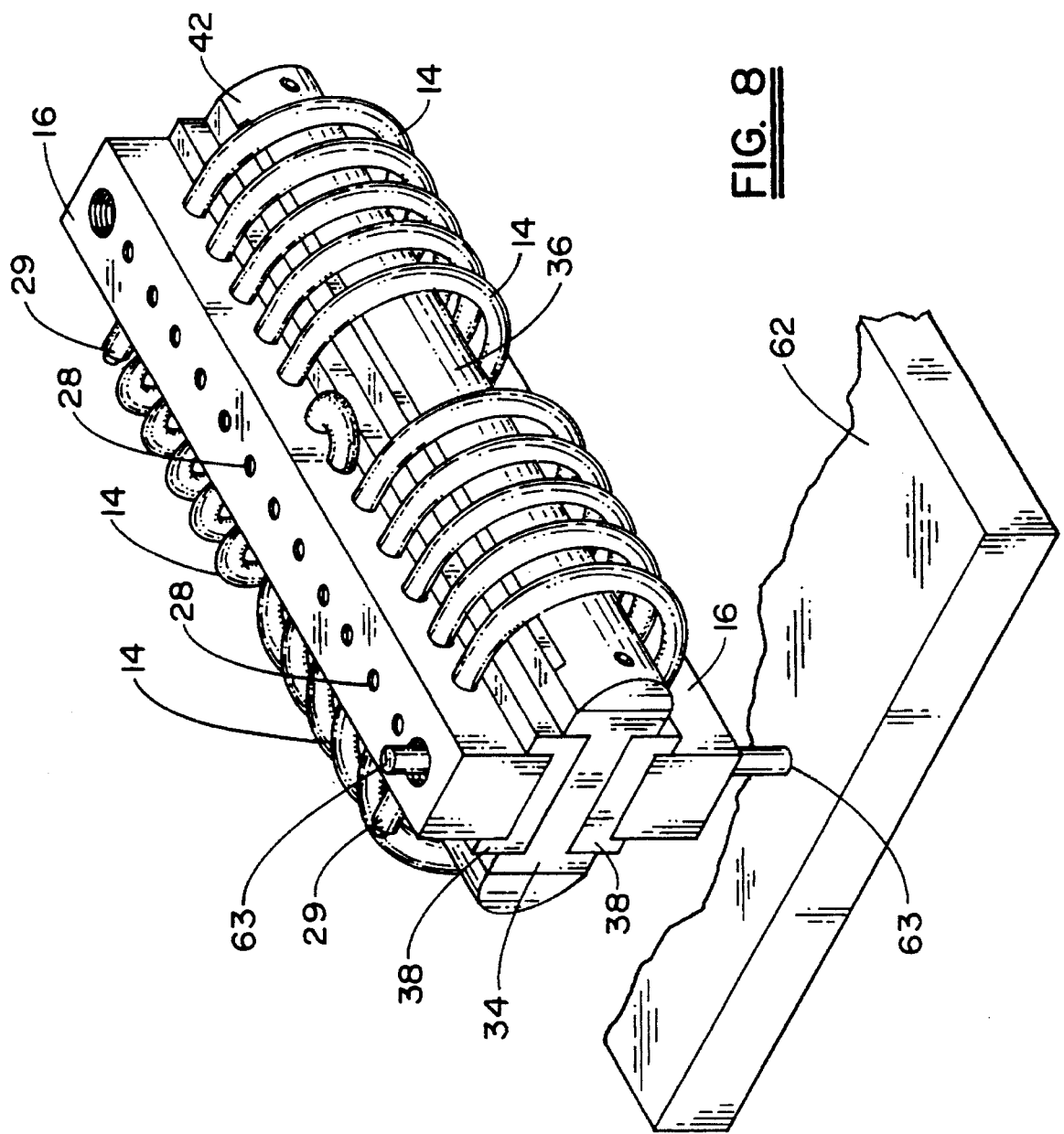
FIG. 8 is a partially broken away isolated perspective view of the wire rope vibration isolator and multi-piece reaction bar assembly shown in FIGS. 6 and 7.

With reference now to FIGS. 5 and 8, this removal process includes first removing the reaction bar 32 and isolator assembly 10 away from the lower stripper 62 by lifting the assembly over the mounting pegs 63. The lynch pin 44 is removed. Next, one of the two side bars 36 is urged forward until the end step 42 clears the end of the center block 34. This is done while the slide bars 38 and the center block 34 remain in position. The other side bar 36 is removed in a similar manner. The center block 34 is then urged forward so that is may slid out from between the slide bars 38. Once the center block 34 is removed in this manner, the slide bars 38 are carefully pulled away from their respective crimp bars 16 so that scratching or defacing of the malleable crimp bars 16 is avoided. Alternatively, the center bar 34 may be slid out first, with the side bars 36 following, and then the slide bars 38 as described above.

While this invention has been described in detail with reference to a certain preferred embodiment and a preferred method for making the illustrated embodiment, it should be appreciated that the present invention is not limited to those precise embodiments. Rather, in view of the present disclosure which describes the best mode for practicing the invention, many modifications and variations would present themselves to those of skill in the art without departing from the scope and spirit of this invention, as defined in the following claims.

What is claimed is:

1. A wire rope vibration isolator, comprising:
   a substantially cylindrical coil of wire rope having a predetermined number of individual consecutive coils; and
   crimp means for securing each of said predetermined number of individual consecutive coils in a fixed position relative to one another while allowing the coils to flex so as to absorb vibrational energy, said crimp means extending longitudinally along the length of said substantially cylindrical coil of wire rope, said crimp means including two opposed blocks of material securing said predetermined number of individual consecutive coils by deforming said blocks of material into securing contact with said coils such that said coils are secured to said blocks by forming a mechanical bond between said coils and said blocks, without the use of any additional fasteners.

2. The wire rope vibration isolator according to claim 1 wherein said crimp means includes two crimp bars, each of said crimp bars being essentially rectangular in shape thereby having opposing top and bottom surfaces, opposing side surfaces, and two end surfaces, each of said crimp bars further having a series of lateral holes formed through the bar from one side surface to the other side surface thereof so that said predetermined number of individual consecutive coils may be threaded through said series of lateral holes of each of the bars whereby when a crimping force is applied to each of said two crimp bars at a point where each of said individual coils passes through a respective bar, said individual coils are thereby secured in said fixed position relative to one another.

3. The wire rope vibration isolator according to claim 2 wherein said substantially cylindrical coil of wire rope is formed in the shape of a coil spring.

4. The wire rope vibration isolator according to claim 2 wherein said substantially cylindrical coil of wire rope is formed in the shape of two opposing coil springs, said cylindrical coil having a central U-shaped segment and individual coils extending outwardly therefrom along the length of the coil.

5. A wire rope vibration isolator, comprising:
   a substantially cylindrical coil of wire rope having a plurality of individual consecutive coils; and
   at least one single block of material securing said plurality of individual consecutive coils in a fixed position relative to one another by deforming said block of material into securing contact with said coils such that said coils are secured to said blocks by forming a mechanical bond between said coils and said blocks, without the use of any additional fasteners so that said substantially cylindrical coil of wire rope acts as a damped spring for providing vibration isolation.

6. The wire rope vibration isolator according to claim 5 including two single blocks of material being opposingly positioned along the length of said substantially cylindrical coil of wire rope.

7. The wire rope vibration isolator according to claim 6 wherein each of said two single blocks of material are substantially rectangular in shape having opposing side surfaces, each of said single blocks further having a series of lateral holes formed through the block from one side surface to the other side surface thereof so that said plurality of individual consecutive coils may be threaded through said series of lateral holes of each of the blocks whereby when a crimping force is applied to each of said two single blocks of material at a point where each of said individual coils passes through a respective block, said individual coils are thereby secured in said fixed position relative to one another.

8. The wire rope vibration isolator according to claim 7 wherein said substantially cylindrical coil of wire rope is formed in the shape of a coil spring.

9. The wire rope vibration isolator according to claim 7 wherein said substantially cylindrical coil of wire rope is formed in the shape of two opposing coil springs, said cylindrical coil having a central U-shaped segment and individual coils extending outwardly therefrom along the length of the coil.

10. A wire rope vibration isolator, comprising:

a coil of wire rope having a predetermined number of individual consecutive coils; and a first crimp bar and a second crimp bar, each of said crimp bars being essentially rectangular in shape thereby having opposing top and bottom surfaces, opposing side surfaces, and two end surfaces, each of said crimp bars further having a series of lateral holes formed through the bar from one side surface to the other side surface thereof so that said predetermined number of individual consecutive coils may be threaded through said series of lateral holes of each of the bars whereby when a crimping force is applied to each of said two crimp bars at a point where each of said individual coils passes through a respective bar to deform said bars into securing contact with said coils such that said coils are secured to said blocks by forming a mechanical bond between said coils and said block, without the use of any additional fasteners, such that said first crimp bar and a second crimp bar may move relative to each other to dissipate vibrational energy.

11. The wire rope vibration isolator according to claim 10 wherein said coil of wire rope is formed in the shape of a coil spring.

12. The wire rope vibration isolator according to claim 10 wherein said coil of wire rope is formed in the shape of two opposing coil springs, said cylindrical coil having a central U-shaped segment and individual coils extending outwardly therefrom along the length of the coil.

* * * * *